United States Patent
Jung

(10) Patent No.: US 7,066,232 B2
(45) Date of Patent: Jun. 27, 2006

(54) APPARATUS AND METHOD OF MANUFACTURING LAMINATED STEEL SHEET

(75) Inventor: Sung-Man Jung, Suncheon-Si (KR)

(73) Assignee: Daesung Inc., Gwang Yang-Si (KR)

( * ) Notice: Subject to any disclaimer, the term of this patent is extended or adjusted under 35 U.S.C. 154(b) by 0 days.

(21) Appl. No.: 10/430,236

(22) Filed: May 6, 2003

(65) Prior Publication Data

US 2004/0173293 A1 Sep. 9, 2004

(30) Foreign Application Priority Data

Mar. 7, 2003 (KR) .................................. 10-2003-0014346

(51) Int. Cl.
*B32B 31/00* (2006.01)

(52) U.S. Cl. ........................ 156/535; 156/281; 156/543; 29/779

(58) Field of Classification Search ................. 156/281, 156/324, 535, 543, 549; 29/779, 819, DIG. 7
See application file for complete search history.

(56) References Cited

U.S. PATENT DOCUMENTS

| | | | | | |
|---|---|---|---|---|---|
| 2,545,370 A | * | 3/1951 | Mittelmann | ................. | 156/153 |
| 3,573,133 A | * | 3/1971 | Harris | ......................... | 156/180 |
| 3,767,500 A | * | 10/1973 | Tally et al. | .................. | 156/184 |
| 3,791,801 A | * | 2/1974 | Ariga et al. | ................. | 428/639 |
| 5,496,449 A | * | 3/1996 | Ishibashi et al. | ............ | 205/762 |

* cited by examiner

*Primary Examiner*—Mark A. Osele
(74) *Attorney, Agent, or Firm*—Cha & Reiter, LLC

(57) ABSTRACT

An apparatus for manufacturing a laminated steel sheet by treating surfaces of a base steel sheet so that the adhesive strength between a base steel sheet and lamination sheets is increased. The apparatus comprises an uncoiler for unwinding a coiled base steel sheet followed by a cleaner for cleaning the surfaces of the base steel sheet. The cleaner comprises an acid pickling unit for pickling the surfaces of a hot rolled steel sheet with acid pickling water when the base steel sheet is the hot rolled steel sheet, an alkali cleaning unit for cleaning the surfaces of a galvanized steel sheet with alkali cleaning water when the base steel sheet is the galvanized steel sheet, and a rinsing unit. The acid pickling unit and the alkali cleaning unit are selectively used on the basis of kinds of the base steel sheet supplied from the uncoiler.

6 Claims, 4 Drawing Sheets

APPARATUS AND METHOD OF MANUFACTURING LAMINATED STEEL SHEET

CLAIM OF PRIORITY

This application makes reference to, and claims all benefits accruing under 35 U.S.C. Section 119 from an application for APPARATUS AND METHOD OF MANUFACTURING LAMINATED STEEL SHEET, filed earlier in the Korean Intellectual Property Office on MAR. 7, 2003 and there duly assigned Serial No. 10-2003-0014346.

BACKGROUND OF THE INVENTION

1. Field of the Invention

The present invention relates to a method of manufacturing a laminated steel sheet and an apparatus for carrying out such a method, and more particularly to a method of manufacturing a laminated steel sheet which is capable of increasing the adhesive strength between a base steel sheet and lamination sheets attached to the surfaces of the base steel sheet, and of utilizing various kinds of steel for the base steel sheet, and an apparatus for carrying out such a method.

2. Description of the Related Art

As well known to those skilled in the art, various kinds or shapes of steel sheets are manufactured and distributed according to the purpose of their uses. Such steel sheets may be subjected to a plating process or a chemical treatment, by which the steel sheets have various properties. Recently, a laminated steel sheet comprising a base steel sheet and lamination sheets made of various materials, the lamination sheets being attached to the surfaces of the base steel sheet, has been manufactured and widely used to improve corrosion resistance, abrasion resistance, impact resistance, chemical resistance, durability, etc. of the sheet.

Such a laminated steel sheet may be manufactured by shot blasting a galvanized steel sheet and high frequency laminating the shot blasted galvanized steel sheet with polyethylene sheets. This laminated steel sheet may be used, for example, for a corrugated pipe or other structural members disposed in the ground or on the ground, through which rainwater or sewage flows.

However, the aforesaid laminated steel sheet is not of a high quality in that adhesive strength is poor between the base steel sheet and the lamination sheets.

The conventional method for manufacturing laminated steel sheets is mainly applied to the expensive galvanized steel sheets, not to general steel sheets.

Furthermore, the conventional method for manufacturing laminated steel sheets utilizes the high-frequency laminating system, which is mainly applied to a very thin steel sheet. Consequently, a new method utilizing a low-frequency laminating system as well as a high-frequency laminating system is needed.

SUMMARY OF THE INVENTION

Therefore, the present invention has been made in view of the above problems, and it is one aspect of the present invention to provide a method for manufacturing a laminated steel sheet that is capable of attaching lamination sheets to the surfaces of even a common hot rolled steel sheet, and of securely attaching the lamination sheets to the surfaces of one selected from various kinds of base steel sheets, and an apparatus for carrying out the aforesaid method.

It is another aspect of the present invention to provide a method for manufacturing a laminated steel sheet that is capable of utilizing a laminating system with various ranges of frequencies and various surface treatments, and an apparatus for carrying out the aforesaid method.

In one embodiment, an apparatus for manufacturing a laminated steel sheet is provided and includes: an uncoiler for unwinding a coiled base steel sheet and supplying the uncoiled base steel sheet; a cleaner comprising an acid pickling unit for pickling the surfaces of a hot rolled steel sheet with acid pickling water when the base steel sheet is the hot rolled steel sheet, an alkali cleaning unit for cleaning the surfaces of a galvanized steel sheet with alkali cleaning water when the base steel sheet is the galvanized steel sheet, and a rinsing unit for rinsing the base steel sheet with rinsing water, the acid pickling unit and the alkali cleaning unit being selectively used on the basis of kinds of the base steel sheet supplied from the uncoiler; a first drier for drying the base steel sheet cleaned by the cleaner; a heater for heating the base steel sheet dried by the first drier; a laminator for attaching lamination sheets to the surfaces of the base steel sheet heated by the heater to form a laminated steel sheet; a cooler for cooling and hardening the lamination sheets attached to the base steel sheet of the laminated steel sheet; a second drier for drying the cooled lamination sheets attached to the surfaces of the base steel sheet of the laminated steel sheet; and a re-coiler for winding the dried laminated steel sheet in the form of a reel.

In accordance with another aspect of the present invention, there is provided a method for manufacturing a laminated steel sheet, comprising the steps of: supplying a base steel sheet; cleaning the base steel sheet, the cleaning step comprising the steps of acid pickling the surfaces of a hot rolled steel sheet with acid pickling water when the base steel sheet is the hot rolled steel sheet, alkali cleaning the surfaces of a galvanized steel sheet with alkali cleaning water when the base steel sheet is the galvanized steel sheet, and rinsing the base steel sheet with rinsing water; drying the cleaned base steel sheet; heating the dried base steel sheet; attaching lamination sheets to the surfaces of the heated base steel sheet to form a laminated steel sheet; cooling and hardening the lamination sheets of the laminated steel sheet; drying the lamination sheets of the laminated steel sheet; and winding the dried laminated steel sheet in the form of a reel.

BRIEF DESCRIPTION OF THE DRAWINGS

The above features and other advantages of the present invention will be more clearly understood from the following detailed description taken in conjunction with the accompanying drawings, in which.

DESCRIPTION OF THE PREFERRED EMBODIMENTS

Figure 1A:
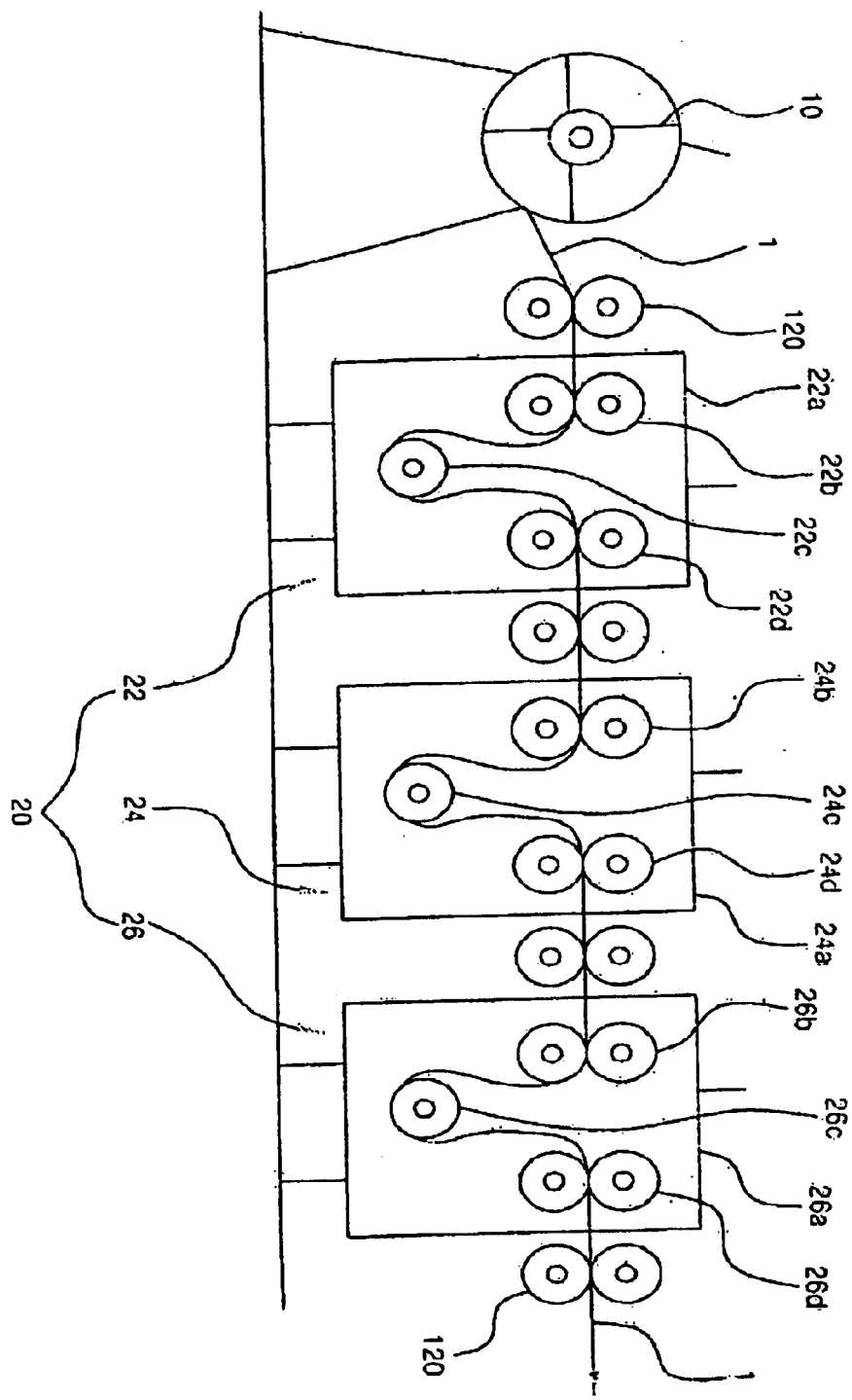
FIGS. 1a to 1c show main components of an apparatus for manufacturing a laminated steel sheet according to the present invention, respectively.
Figure 1B:
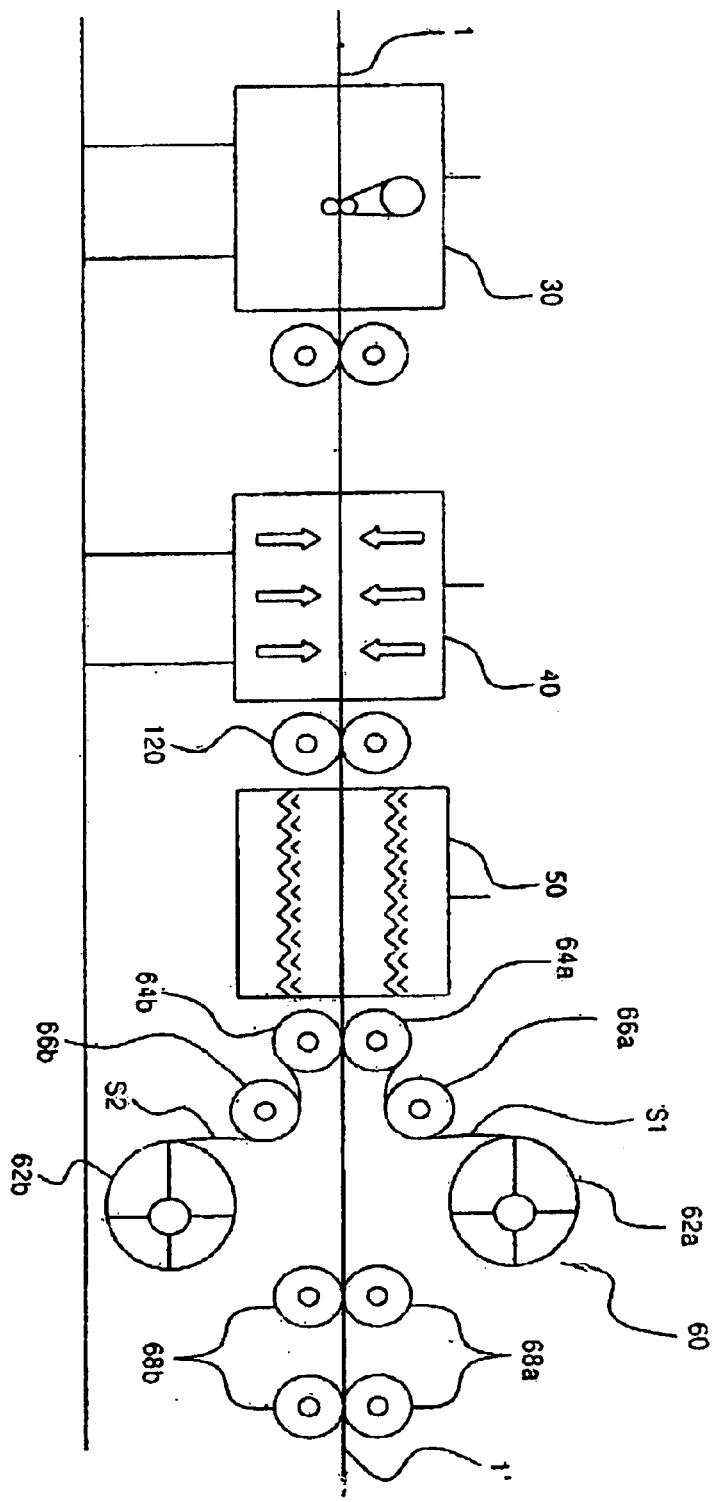
Figure 1C:
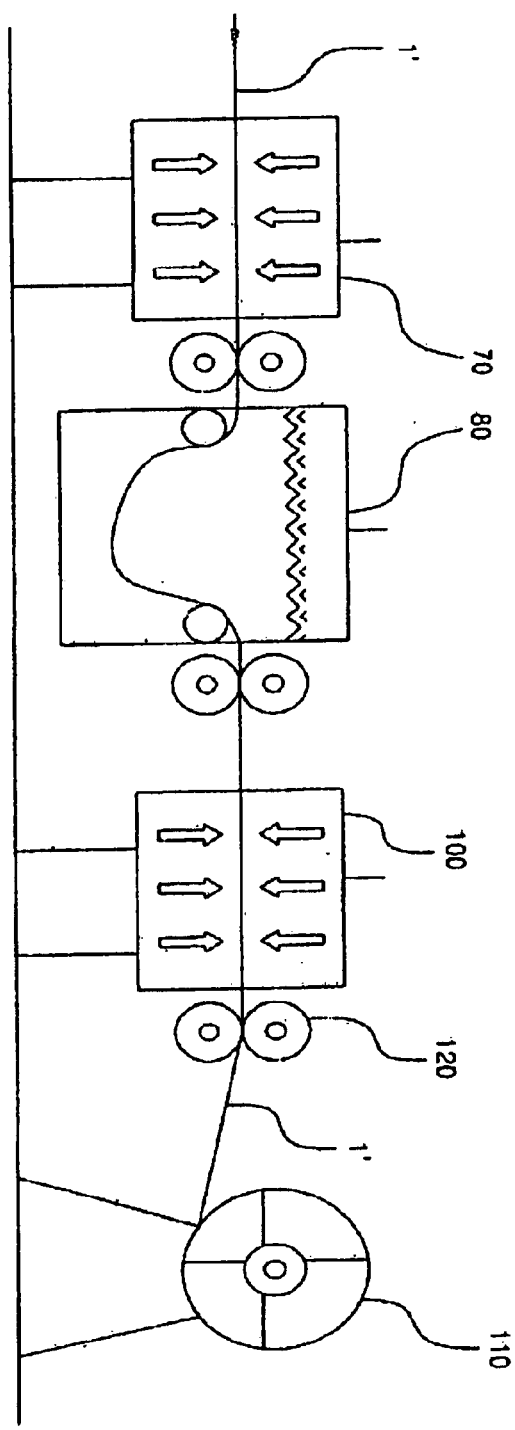

Referring to FIGS. 1a to 1c, an apparatus for manufacturing a laminated steel sheet basically includes an uncoiler 10 on which a base steel sheet 1 is releasably wound.

At the rear of the uncoiler 10 is disposed a cleaner 20 for cleaning the base steel sheet 1 supplied from the uncoiler 10.

The cleaner 20 comprises a plurality of cleaning units, which are selectively used according to kinds of the base steel sheet 1. Specifically, the cleaner 20 comprises an acid pickling unit 22 for pickling the surfaces of a general steel sheet with acid pickling water when the base steel sheet 1 is the general steel sheet, an alkali cleaning unit 24 for cleaning the surfaces of a galvanized steel sheet with alkali cleaning water when the base steel sheet 1 is the galvanized steel sheet, and a rinsing unit 26 for rinsing the base steel sheet 1 previously cleansed by one of the aforesaid units 22 and 24 with rinsing water.

The acid pickling unit 22 comprises a bath or tank 22a storing water containing 15% to 18% hydrochloric acid for removing an oxide coating, foreign substances, etc., on the surfaces of the base steel sheet 1. The acid water is preferably maintained at a temperature of 60° C. to 80° C. In the bath or tank 22a is disposed a pair of introducing rollers 22b followed by a depositing roller 22c for depositing the base steel sheet 1 having passed between the introducing rollers 22b in the acid water, and a pair of discharging rollers 22d for discharging the base steel sheet 1 leaving the depositing roller 22c out of the tank 22a.

The alkali cleaning unit 24 comprises a bath or tank 24a disposed at the rear of the acid pickling unit 22. The bath of tank 24a stores water containing 2% to 3% alkali and 0.01% to 0.05% defatting agent having a low temperature for removing fat and oil, foreign substances, etc., on the surfaces of the galvanized base steel sheet 1. The alkali water is preferably maintained at a temperature of 40° C. to 70° C. In the bath or tank 24a are disposed a pair of introducing rollers 24b followed by a depositing roller 24c for depositing the base steel sheet 1 having passed between the introducing rollers 24b in the alkali water, and a pair of discharging rollers 24d for discharging the base steel sheet 1 leaving the depositing roller 24c out of the tank 24a.

The rinsing unit 26 comprises a bath or tank 26a storing rinsing water for rinsing the surfaces of the base steel sheet 1 discharged from the alkali cleaning unit 24. The rinsing water is preferably maintained at a temperature of 60° C. to 75° C. In the bath or tank 26a are disposed a pair of introducing rollers 26b followed by a depositing roller 26c for depositing the base steel sheet 1 having passed between the introducing rollers 26b in the rinsing water, and a pair of discharging rollers 26d for discharging the base steel sheet 1 leaving the depositing roller 26c out of the tank 26a.

Preferably, a surface treating device 30 may be disposed at the rear of the cleaner 20 which properly treats the surfaces of the base steel sheet 1 made of the general steel sheet after the aforesaid cleaning process is carried out by the cleaner 20 in case that the surfaces of the base steel sheet 1 are not flat or even. The surface treating device 30 is preferably realized by a polishing unit having # 50 to # 300 sandpaper for polishing the surfaces of the base steel sheet 1 and operated at a speed of 50 rpm to 400 rpm.

At the rear of the surface treating device 30 is disposed a first drier 40 for drying the base steel sheet 1 cleaned by the cleaner 20 or treated by the surface treating device 30. The base steel sheet 1 is preferably dried at a temperature of 90° C. to 110° C. under an air pressure of 0.5 to 2.5 kg/m$^3$ in the first drier 40.

At the rear of the first drier 40 is disposed a heater 50 for heating the dried base steel sheet 1. The heater 50 is preferably realized by a frequency induction heating device. Most preferably, the base steel sheet 1 is continuously heated at a temperature of 100° C. to 450° C. using a low frequency of 60 to 10,000 C.P.S. and a high frequency of 10,000 to 500,000 C.P.S.

At the rear of the heater 50 is disposed a laminater 60 for attaching lamination sheets to the surfaces of the base steel sheet 1 dried by the heater 50. The laminater 60 comprises a pair of reels 62a and 62b on which the lamination sheets S1 and S2 to be attached to the surfaces of the base steel sheet 1 are releasably wound, respectively, and a pair of pressing rollers 64a and 64b for pressing the lamination sheets S1 and S2 supplied from the reels 62a and 62b against the surfaces of the base steel sheet 1, respectively. Between the reels 62a and 62b and the pressing rollers 64a and 64b may be further disposed a pair of guiding rollers 66a and 66b for guiding the lamination sheets S1 and S2 supplied from the reels 62a and 62b with an appropriate tension, respectively. Also, at the rear of the pressing rollers 64a and 64b may be disposed a pair of second pressing rollers 68a and 68b for further pressing the lamination sheets S1 and S2 attached to the surfaces of the base steel sheet 1. Preferably, each of the pair of second pressing rollers 68a and 68b comprises a plurality of rollers. Each of the lamination sheets is preferably made of polyethylene or polypropylene. Preferably, each of the lamination sheets has a thickness of approximately 0.2 to 1.5 mm and a hardness of 45 to 80 HSA. Of course, it is to be understood that the material, the thickness, and the hardness of each of the lamination sheets may be selected according to the use of a final laminated steel sheet and the demand of a buyer or a manufacturer.

At the rear of the laminater 60 is disposed a first cooler 70 for cooling the lamination sheets attached to the surfaces of the base steel sheet 1. The first cooler 70 is preferably realized by an air cooling device for cooling the lamination sheets S1 and S2 attached to the surfaces of the base steel sheet 1, for example, at a temperature of 0° C. to 30° C. under a pressure of 0.5 to 1.0 kg/m$^3$.

At the rear of the first cooler 70 is disposed a second cooler 80 for further cooling the lamination sheets S1 and S2 attached to the surfaces of the base steel sheet 1. The second cooler 80 is preferably realized, for example, by a water cooling device for completely cooling the base steel sheet 1 and the lamination sheets S1 and S2 attached to the surfaces of the base steel sheet 1 by spraying cooling water having a normal temperature onto the lamination sheets S1 and S2 attached to the surfaces of the base steel sheet 1 or depositing the lamination sheets S1 and S2 attached to the surfaces of the base steel sheet 1 in the cooling water so that the lamination sheets S1 and S2 attached to the surfaces of the base steel sheet 1 are cured.

At the rear of the second cooler 80 is disposed a second drier 100 for finally drying the cooled base steel sheet 1 and the cooled lamination sheets S1 and S2 attached to the surfaces of the base steel sheet 1. The second drier 100 is preferably realized by an air drying device for finally drying the base steel sheet 1 and the lamination sheets S1 and S2 attached to the surfaces of the base steel sheet 1, for example, at a temperature of 50° C. to 70° C. under a pressure of 0.5 to 2.5 kg/m$^3$.

At the rear of the second drier 100 is finally disposed a re-coiler 110 for winding a finished laminated steel sheet 1' in the form of a reel.

Between the aforesaid components constituting the apparatus for manufacturing the laminated steel sheet according to the present invention are preferably interposed pairs of guiding rollers 120 for properly and stably maintaining the tension of the base steel sheet 1 or the laminated steel sheet 1' passing through the components. For example, the guiding rollers 120 may be interposed between the uncoiler 10 and the acid pickling unit 22 of the cleaner 20, between the acid pickling unit 22 and the alkali cleaning unit 24 of the cleaner 20, between the alkali cleaning unit 24 and the rinsing unit 26 of the cleaner 20, between the rinsing unit 26 and the surface treating device 30, between the surface treating device 30 and the first drier 40, between the first drier 40 and the heater 50, between the first cooler 70 and the second cooler 80, between the second cooler 80 and the second drier 100, and between the second drier 90 and the re-coiler 110, respectively. Each pair of guiding rollers 120 may be disposed in contact with the surfaces of the base steel sheet 1 for guiding or drawing the base steel sheet 1 while pressing the base steel sheet 1.

The operation of manufacturing a laminated steel sheet using the apparatus for manufacturing the laminated steel sheet with the afore-stated construction according to the present invention will now be described in detail.

In case that the base steel sheet 1 is a hot rolled steel sheet, the base steel sheet 1 supplied from the uncoiler 10 is introduced into the acid pickling unit 22 of the cleaner 20 where the surfaces of the base steel sheet 1 are pickled. Specifically, the base steel sheet 1 passes between the introducing rollers 22*b*, passes around the depositing roller 22*c*, and passes between the discharging rollers 22*d* disposed in the tank 22*a* of the acid pickling unit 20 in which water containing 15% to 18% hydrochloric acid is stored at a temperature of 60° C. to 80° C., so that any oxide coating, foreign substances, etc., on the surfaces of the base steel sheet 1 are removed.

The pickled base steel sheet 1 is rinsed by the rinsing unit 26. Specifically, the base steel sheet 1 passes between the introducing rollers 26*b*, passes around the depositing roller 26*c*, and passes between the discharging rollers 26*d* disposed in the tank 26*a* in which the rinsing water is stored at a temperature of 60° C. to 75° C., so that the surfaces of the base steel sheet 1 are rinsed.

The rinsed base steel sheet 1 is dried at a temperature of approximately 90° C. to 110° C. under a pressure of 0.5 to 2.5 kg/m$^3$.

The dried base steel sheet 1 is continuously heated at a temperature of 100° C. to 450° C. and at a low frequency of 60 to 10,000 C.P.S. and a high frequency of 10,000 to 500,000 C.P.S.

The lamination sheets S1 and S2 are attached to the surfaces of the heated base steel sheet 1 by means of the laminater 60, respectively. Specifically, lamination sheets S1 and S2 supplied from the reels 62*a* and 62*b* are attached to the surfaces of the base steel sheet 1 by means of the pressing rollers 64*a* and 64*b*, respectively. At this time, the lamination sheets S1 and S2 supplied from the reels 62*a* and 62*b* are properly guided with the appropriate tension by means of the guiding rollers 66*a* and 66*b*, respectively. Subsequently, the lamination sheets S1 and S2 are further pressed against the surfaces of the base steel sheet 1 by means of the second pressing rollers 68*a* and 68*b* disposed at the rear of the pressing rollers 64*a* and 64*b*, respectively. Each of the lamination sheets S1 and S2 is made of polyethylene or polypropylene having a thickness of approximately 0.2 to 1.5 mm and a hardness of 45 to 80 HSA.

The lamination sheets S1 and S2 attached to the surfaces of the base steel sheet 1 by means of the laminater 60 are firstly cooled at a temperature of 0° C. to 30° C. under a pressure of 0.5 to 1.0 kg/m$^3$ in the first cooler 70 so that the lamination sheets S1 and S2 are firstly cured.

The firstly cooled lamination sheets S1 and S2 and/or the base steel sheet 1 are delivered to the second cooler 80 where the lamination sheets S1 and S2 and/or the base steel sheet 1 are secondly cooled with the cooling water having a normal temperature.

The secondly cooled base steel sheet 1 and the lamination sheets S1 and S2 attached on the surfaces of the base steel sheet 1 are dried, for example, at a temperature of 50° C. to 70° C. under a pressure of 0.5 to 2.5 kg/m$^3$ in the second drier 90.

Finally, the laminated steel sheet 1', which is made up of the base steel sheet 1 and the lamination sheets S1 and S2 attached on the surfaces of the base steel sheet 1, dried by the second drier 100 is releasably wound on the re-coiler 110 to be stored for future use or any subsequent process.

In case that the base steel sheet 1 is a galvanized steel sheet, the base steel sheet 1 supplied from the uncoiler 10 is introduced into the alkali cleaning unit 24 of the cleaner 20 where the surfaces of the base steel sheet 1 are cleaned. Specifically, the base steel sheet 1 passes between the introducing rollers 24*b*, passes around the depositing roller 24*c*, and passes between the discharging rollers 24*d* disposed in the tank 24*a* of the alkali cleaning unit 24 in which water containing 2% to 3% alkali and 0.01% to 0.05% defatting agent is stored at a temperature of 40° C. to 70° C., so that any fat and oil, a foreign substance, etc., on the surfaces of the galvanized base steel sheet 1 are removed.

Afterwards, a process similar to that carried out utilizing the hot rolled steel sheet is carried out so that the laminated steel sheet is manufactured. Specifically, the laminated steel sheet is manufactured by the steps of rinsing the base steel sheet 1 by means of the rinsing unit 26, drying the rinsed base steel sheet 1 by means of the first drier 40, heating the dried base steel sheet 1 by means of the heater 50, attaching the lamination sheets S1 and S2 to the surfaces of the base steel sheet 1 by means of the laminater 60, cooling the lamination sheets S1 and S2 with air by means of the first cooler 70 to firstly cure the lamination sheets S1 and S2, cooling the lamination sheets S1 and S2 with water by means of the second cooler 80 to secondly cure the lamination sheets S1 and S2, drying the laminated steel sheet 1' by means of the second drier 100, and winding the laminated steel sheet 1' on the re-coiler 110.

In case that the base steel sheet 1 is a hot rolled steel sheet having uneven surfaces, the surfaces of the base steel sheet 1 are polished by means of the surface treating device 30 comprising a polishing unit having # 50 to # 300 sandpaper for polishing the surfaces of the base steel sheet 1 and operated at a speed of 50 rpm to 400 rpm.

The base steel sheet 1 is dried at a temperature of approximately 90 to 110° C. under a pressure of 0.5 to 2.5 kg/m$^3$.

Subsequently, the lamination sheets S1 and S2 are attached to the surfaces of the base steel sheet 1 by the laminater 60, respectively. Specifically, the lamination sheets S1 and S2 supplied from the reels 62*a* and 62*b* are attached to the surfaces of the base steel sheet 1 by means of the pressing rollers 64*a* and 64*b*, respectively. At this time, the lamination sheets S1 and S2 supplied from the reels 62*a* and 62*b* are properly guided with the appropriate tension by means of the guiding rollers 66*a* and 66*b*, respectively. Subsequently, the lamination sheets S1 and S2 are further pressed against the surfaces of the base steel sheet 1 by means of the second pressing rollers 68*a* and 68*b* disposed at the rear of the pressing rollers 64*a* and 64*b*, respectively. Each of the lamination sheets S1 and S2 is made of polyethylene or polypropylene having a thickness of approximately 0.2 to 1.5 mm and a hardness of 45 to 80 HSA.

The lamination sheets S1 and S2 attached to the surfaces of the base steel sheet 1 by means of the laminater 60 are cooled at a temperature of 0° C. to 30° C. under a pressure of 0.5 to 1.0 kg/m³ in the first cooler 70 so that the lamination sheets S1 and S2 are cured.

Finally, the laminated steel sheet 1', which has been cooled and thus cured, is releasably wound on the re-coiler 110 to be stored for future use or any subsequent process.

Of course, it is to be noted that the base steel sheet 1 or the laminated steel sheet 1' may be guided with an appropriate tension by means of the guiding rollers 120 properly interposed between the components of the apparatus according to the present invention so that the lamination sheets S1 and S2 can be uniformly attached to the surfaces of the base steel sheet 1.

Figure 2:
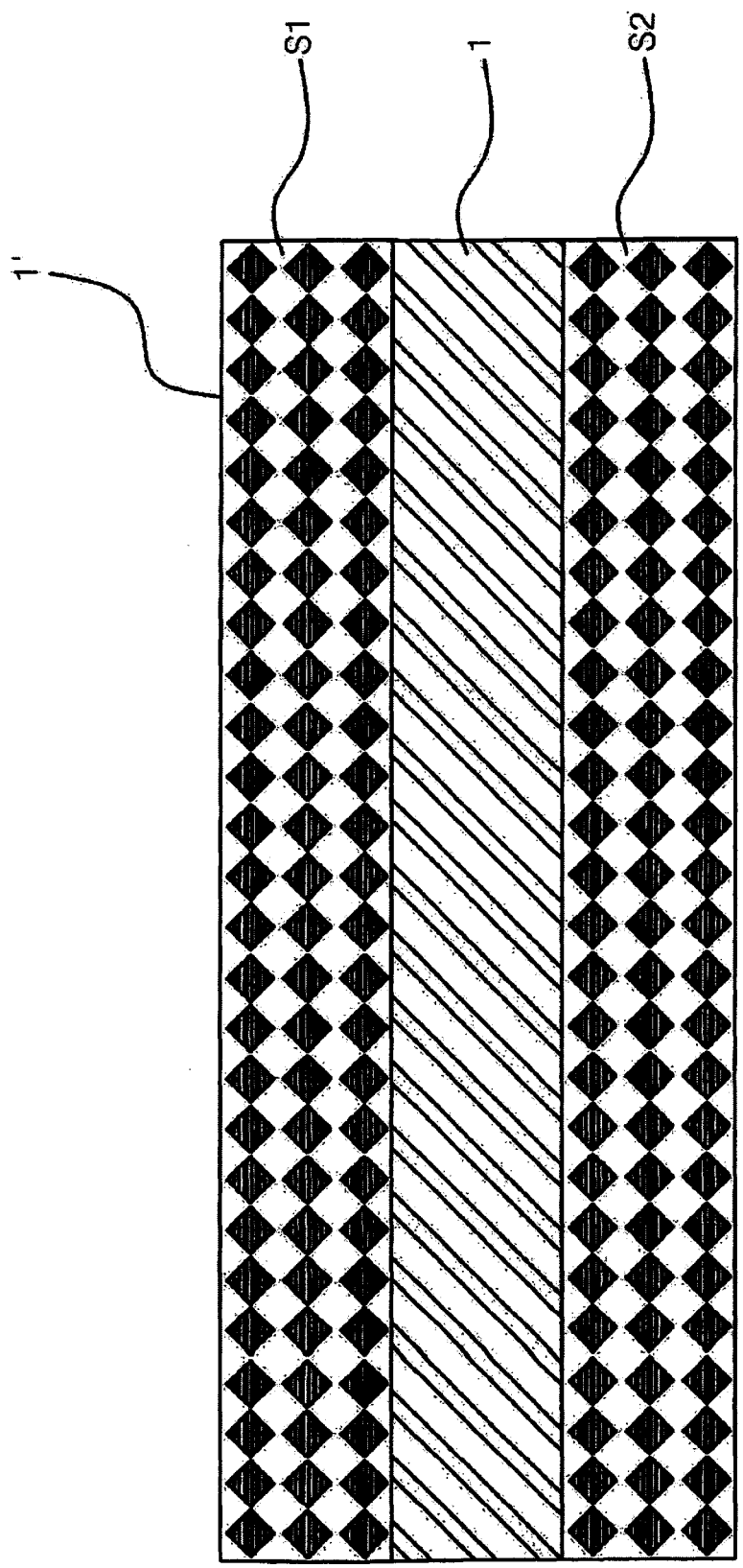
FIG. 2 is a partially enlarged cross sectional view of a laminated steel sheet manufactured by the apparatus for manufacturing the laminated steel sheet of FIG. 1.

The laminated steel sheet 1' manufactured by the aforesaid process has a structure in which the lamination sheets S1 and S2 made of polyethylene or polypropylene are attached to the surfaces of the base steel sheet 1, as shown in FIG. 2. In the laminated steel sheet 1', the thickness of the base steel sheet 1 is between approximately 1 mm and 5 mm, and the thickness of each of the lamination sheet S1 and S2 is between approximately 0.2 mm and 1.5 mm. Of course, it is to be noted that the size and thickness of the base steel sheet or each of the lamination sheets may be determined according to the use of the laminated steel sheet and the demand of a buyer.

As apparent from the above description, the present invention provides a method for manufacturing a laminated steel sheet which is capable of attaching lamination sheets to the surfaces of a general hot rolled steel sheet, and an apparatus for carrying out such a method, whereby the cost for manufacturing the laminated steel sheet is reduced. The present invention also provides a method for manufacturing a laminated steel sheet which is capable of utilizing various kinds of steel for the base steel sheet, and an apparatus for carrying out such a method, whereby various kinds of products can be manufactured.

Furthermore, the surfaces of the base steel sheet are optimally treated so that the adhesive strength between a base steel sheet and lamination sheets attached to the surfaces of the base steel sheet is increased, whereby the quality and reliability of the finished laminated steel sheet are improved. With the present invention, a laminating system with various ranges of frequencies and various surface treatments is utilized to optimally treat the surfaces of the base steel sheet so that the lamination sheets can be reliably attached to the surfaces of the base steel sheet depending on various kinds of base steel sheet, whereby the applicability of the invention is improved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for manufacturing a laminated steel sheet, comprising:
    an uncoiler for unwinding a coiled base steel sheet and supplying the uncoiled base steel sheet;
    a cleaner comprising an acid pickling unit for pickling the surfaces of a hot rolled steel sheet with acid pickling water when the base steel sheet is the hot rolled steel sheet, an alkali cleaning unit for cleaning the surfaces of a galvanized steel sheet with alkali cleaning water when the base steel sheet is the galvanized steel sheet, and a rinsing unit for rinsing the base steel sheet with rinsing water, means for selectively using the acid pickling unit or the alkali cleaning unit on the basis of which kind of base steel sheet is supplied from the uncoiler;
    a first drier for drying the base steel sheet cleaned by the cleaner;
    a heater for heating the base steel sheet dried by the first drier;
    a laminator for attaching lamination sheets to the surfaces the base steel sheet heated by the heater to form a laminated steel sheet;
    a cooler for cooling and hardening the lamination sheets attached to the base steel sheet of the laminated steel sheet;
    a second drier for drying the cooled lamination sheets attached to the surfaces of the base steel sheet of the laminated steel sheet; and
    a re-coiler for winding the dried laminated steel sheet in the form of a reel.

2. The apparatus as set forth in claim 1, wherein each of the acid pickling unit, the alkali cleaning unit, and the rinsing unit comprises:
    a tank for storing acid water, alkali water, or rinsing water;
    a pair of introducing rollers for introducing the base steel sheet into the tank;
    a depositing roller for depositing the base steel sheet having passed between the introducing rollers in the acid water, the alkali water, or the rinsing water; and
    a pair of discharging rollers for discharging the base steel sheet out of the tank.

3. The apparatus as set forth in claim 1, wherein the laminater comprises:
    a pair of reels on which the lamination sheets to be attached to the surfaces of the base steel sheet are releasably wound, respectively;
    a pair of pressing rollers for pressing the lamination sheets supplied from the reels against the surfaces of the base steel sheet, respectively;
    a pair of second pressing rollers for further pressing the lamination sheets attached to the surfaces of the base steel sheet by means of the pair of pressing rollers; and
    a pair of guiding rollers disposed between the reels and the pressing rollers for guiding the lamination sheets supplied from the reels with an appropriate tension, respectively.

4. The apparatus as set forth in claim 1, wherein the cooler comprises:
    a first cooler for cooling the lamination sheets attached to the surfaces of the base steel sheet at a temperature of 0° C. to 30° C. under a pressure of 0.5 to 1.0 kg/m³ so that the lamination sheets attached to the surfaces of the base steel sheet are firstly cured; and
    a second cooler for further cooling the base steel sheet and the lamination sheets attached to the surfaces of the base steel sheet by spraying cooling water having a normal temperature onto the lamination sheets attached to the surfaces of the base steel sheet or depositing the lamination sheets attached to the surfaces of the base steel sheet in the cooling water so that the lamination sheets attached to the surfaces of the base steel sheet are secondly cured.

5. The apparatus as set forth in claim 1, further comprising pairs of guiding rollers for properly and stably guiding the base steel sheet or the laminated steel sheet with an appropriate tension, each pair of guiding rollers being interposed between the uncoiler and the cleaner, between the cleaner and the first drier, between the first drier and the heater, between the cooler and the second drier, and between the second drier and the re-coiler.

6. The apparatus as set forth in claim 1, further comprising a surface treating device realized by a polishing unit having # 50 to # 300 sandpaper for polishing the surfaces of the base steel sheet and operated at a speed of 50 rpm to 400 rpm in case that the base steel sheet is a hot rolled steel sheet having uneven surfaces.

* * * * *